July 27, 1954

J. H. HOLSTEIN 2,684,799

CASING MACHINE

Filed March 25, 1950

JOHN H. HOLSTEIN
INVENTOR
HUEBNER, BEEHLER, WORREL,
HERZIG & CALDWELL
ATTORNEYS

July 27, 1954

J. H. HOLSTEIN 2,684,799

CASING MACHINE

Filed March 25, 1950

JOHN H. HOLSTEIN
INVENTOR
HUEBNER, BEEHLER, WORREL,
HERZIG & CALDWELL
ATTORNEYS

BY Richard M. Worrel

July 27, 1954

J. H. HOLSTEIN 2,684,799

CASING MACHINE

Filed March 25, 1950

JOHN H. HOLSTEIN
INVENTOR

HUEBNER,
BEEHLER,
WORREL,
HERZIG &
CALDWELL
ATTORNEYS

BY
Richard M. Worrel

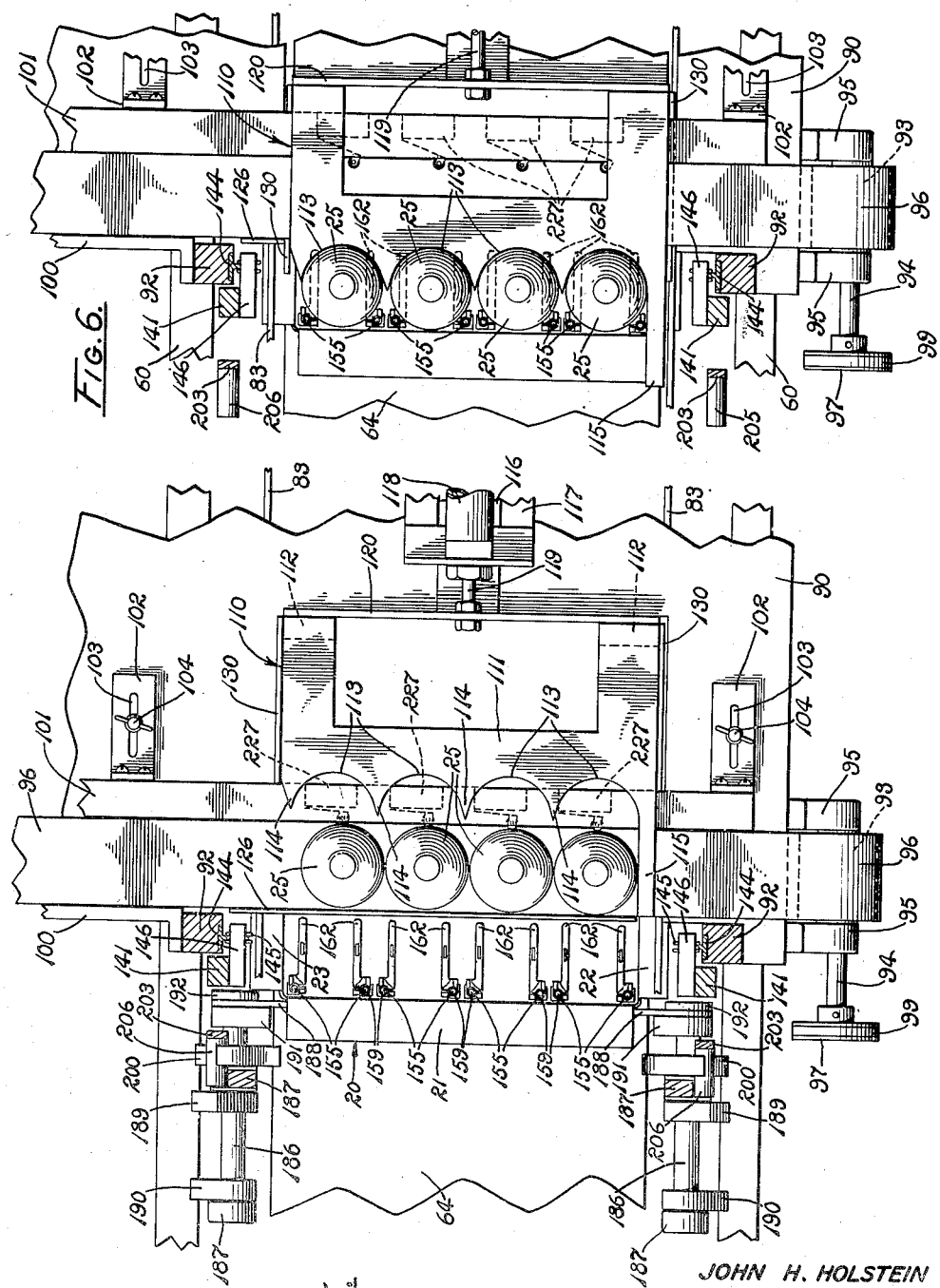

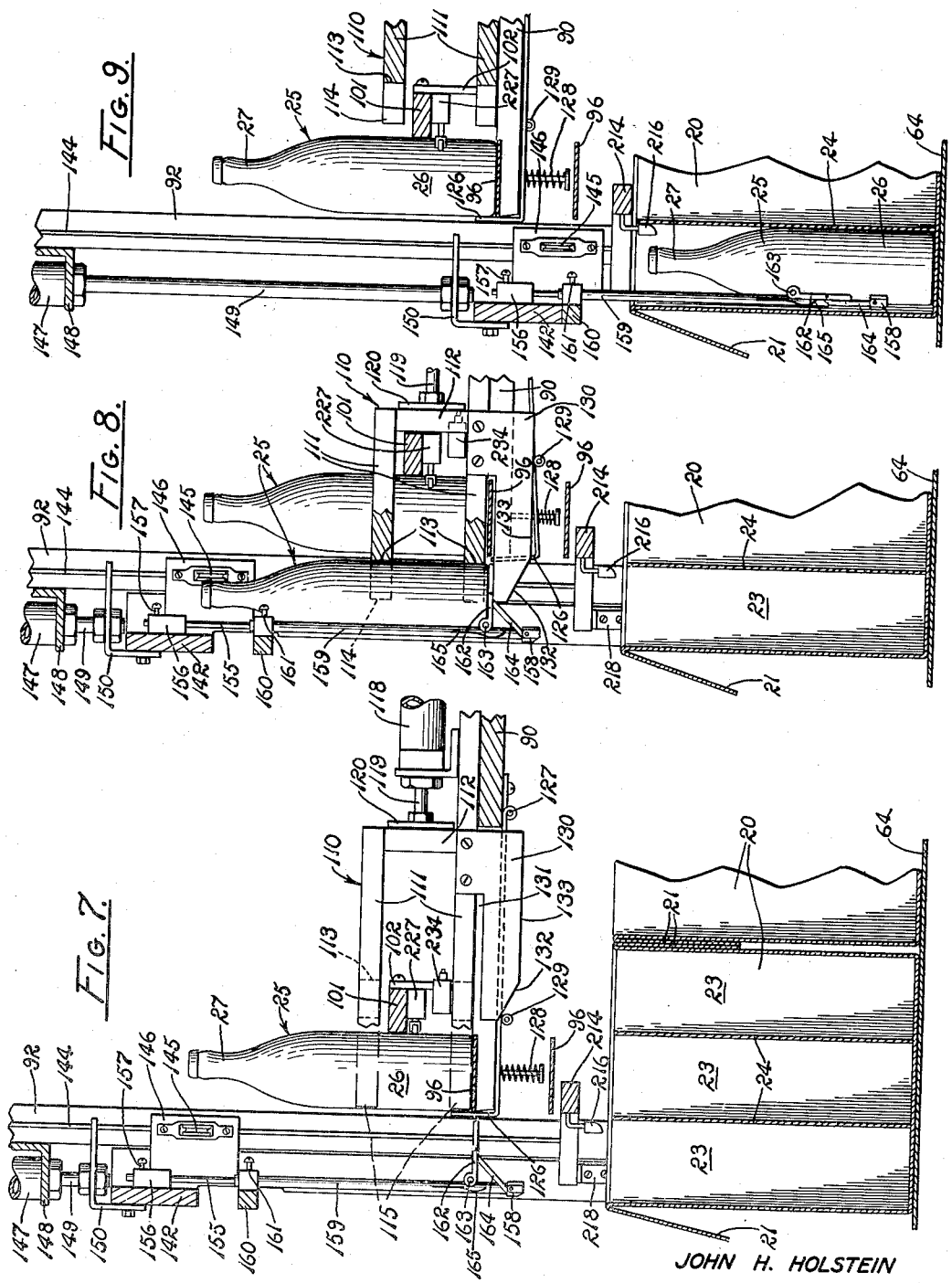

July 27, 1954

J. H. HOLSTEIN 2,684,799

CASING MACHINE

Filed March 25, 1950

JOHN H. HOLSTEIN
INVENTOR

HUEBNER, BEEHLER, WORREL,
HERZIG & CALDWELL
ATTORNEYS

BY Richard M. Worrel

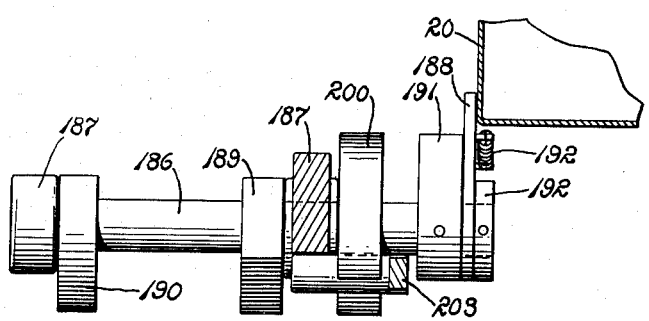
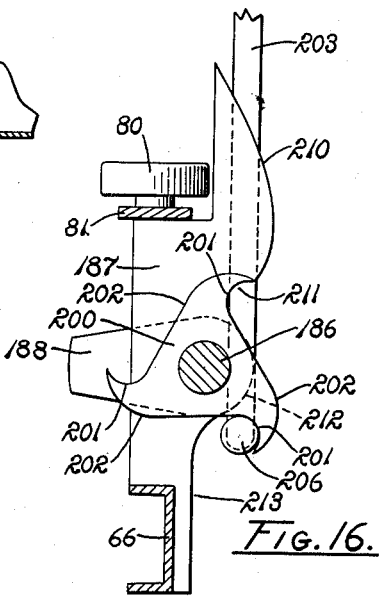
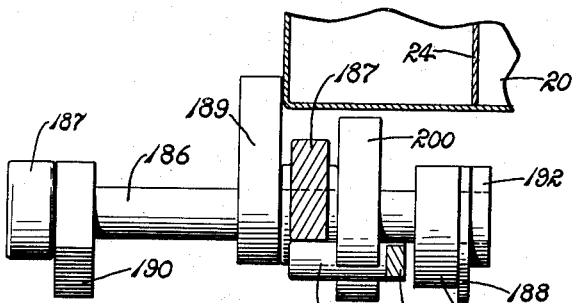
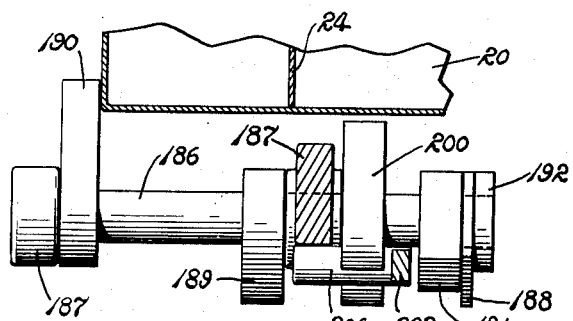
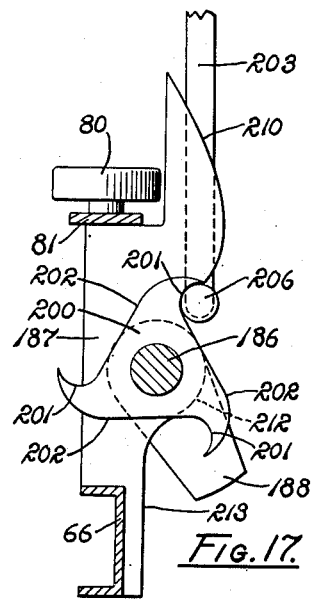
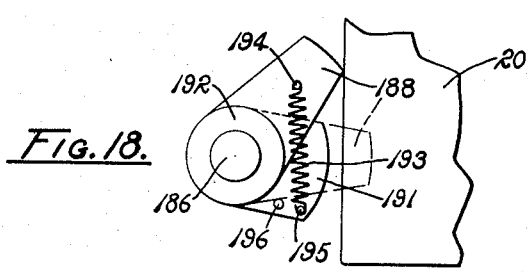

July 27, 1954

J. H. HOLSTEIN 2,684,799

CASING MACHINE

Filed March 25, 1950

JOHN H. HOLSTEIN
INVENTOR

HUEBNER, BEEHLER, WORREL,
HERZIG & CALDWELL
ATTORNEYS

BY
Richard M. Worrel

Patented July 27, 1954

2,684,799

UNITED STATES PATENT OFFICE 2,684,799

CASING MACHINE

John H. Holstein, Fresno, Calif.

Application March 25, 1950, Serial No. 151,852

15 Claims. (Cl. 226—14)

The present invention relates generally to casing machines and more particularly to an apparatus for gently inserting bottled goods or other merchandise into cartons or other packing or storage receptacles.

The placing of bottled beverages and the like into cases for handling, storing, and shipping convenience is a laborious and repetitious task but one which has been difficult to perform by mechanical means. The bottles are generally frail and easily broken. The beverages, if carbonated, frequently cause the botttles to explode when handled in any but a most gentle manner. Such destruction is a waste of the beverages and bottles and constitutes a serious danger to laborers who are near the bottled beverages. Further, great care must be exercised to avoid scratching or scarring the bottles and damaging labels affixed thereto.

Three well known types of apparatus have been provided for the placing of bottled goods into containers. These apparatus are subject to certain difficulties which the present invention has overcome. One such mechanical apparatus drops the bottled goods for gravitational descent into the containers with a resultant high loss due to breakage. Another such apparatus lowers the bottled goods by means of frictional engagement with the sides thereof which not only scratches the bottles but objectionably scratches, tears, and partially removes or displaces labels freshly affixed to the bottles. The third apparatus tumbles the bottled goods and cases therefor during the inserting operation. Among other difficulties, this apparatus subjects the bottled goods to unnecessary rough handling and agitation.

Therefore, it is an object of the present invention to provide an improved apparatus for inserting articles into cases, containers, boxes, crates and the like therefor.

Another object is to obviate or materially reduce the damage to bottled goods and the like incident to the mechanical inserting thereof into cases as conventionally experienced.

Another object is to provide a packaging or casing machine with means for automatically conveying and locating the cases for the insertion of merchandise therein.

Another object of the invention is to provide means for automatically folding the flaps of cartons to out-of-the-way positions for the subsequent insertion of merchandise into the cartons.

Another object is to provide a casing machine with means for inserting merchandise and particularly bottled merchandise into cases in a positive and gentle manner.

Another object is to provide means in a packaging machine, for inserting a plurality of bottles simultaneously into cases provided therefor.

A still further object is to provide a casing machine with automatic sequential operation insuring the proper positioning of operable members for actuation thereof.

Further objects are to provide improved elements and arrangements thereof in a device of the character set forth that is durable, economical, dependable, and fully effective in its operation.

Still further objects and advantages will become apparent in the subsequent description in the specification.

In the drawing:

Fig. 5 is a fragmentary, horizontal, transverse sectional view through the bottle handling portion of the casing machine, as taken along line 5—5 in Fig. 2 of the drawing, showing a plurality of bottles on a bottle conveyor in position to be moved onto a bottle lowering mechanism by means of a bottle loading apparatus shown in retracted position.

Fig. 6 is a view similar to Fig. 5 but showing the bottle loading apparatus in extended position with the plurality of bottles moved thereby onto the bottle lowering mechanism.

Figure 4:
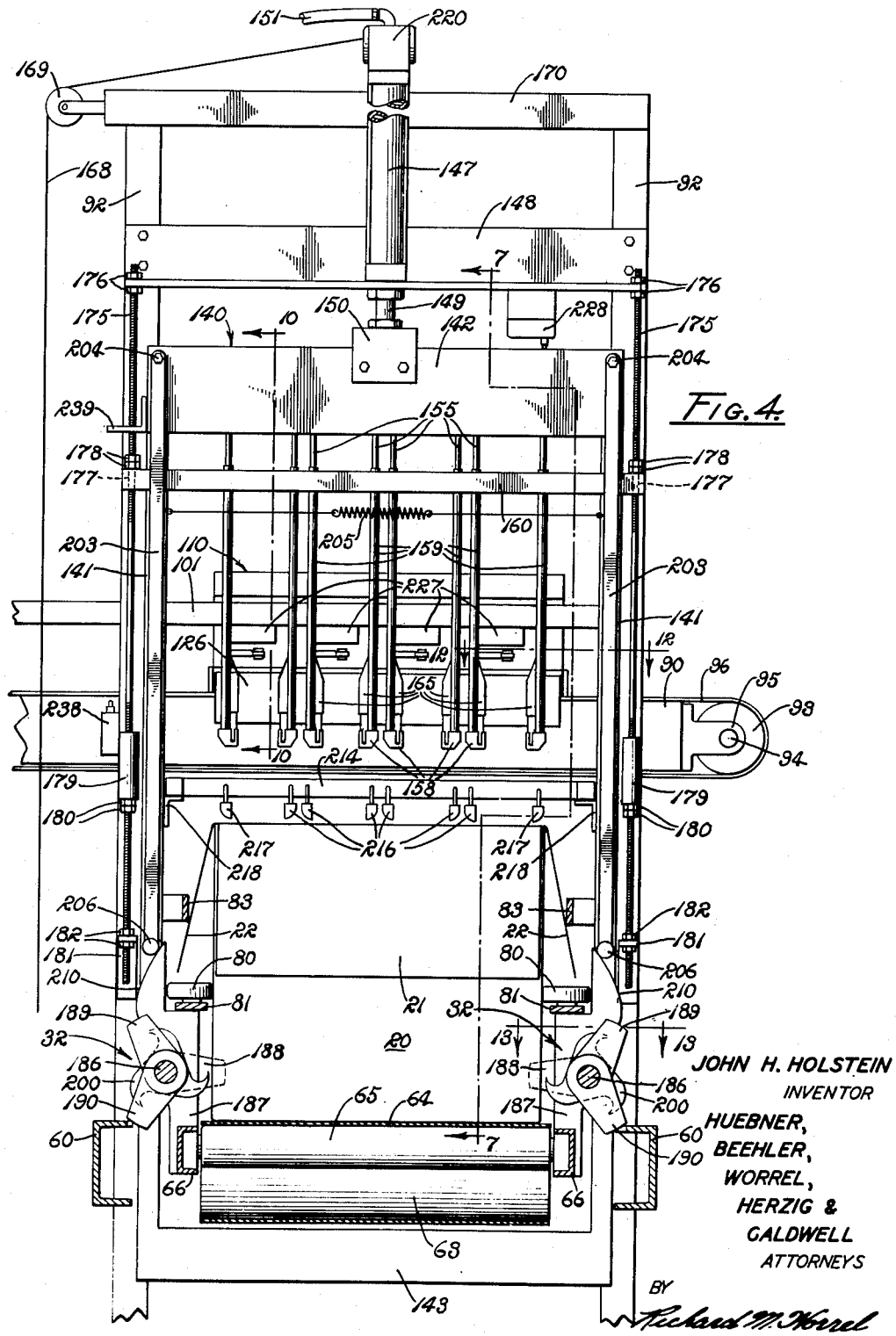
Fig. 4 is a fragmentary, somewhat further enlarged, vertical transverse sectional view through the casing machine, as taken along line 4—4 in Fig. 2.

Fig. 7 is a fragmentary longitudinal sectional view through the bottle handling mechanism and an exemplary case showing the bottle lowering mechanism in raised position to receive bottles thereon and the bottle loading apparatus in retracted position with a plurality of bottles between the bottle lowering device and the bottle loading mechanism on the bottle conveyor therebetween, as taken along line 7—7 in Fig. 4 of the drawing.

Fig. 8 is a view similar to Fig. 7 but with the bottle loading apparatus in extended position with the plurality of bottles moved thereby from the bottle conveyor onto the bottle lowering mechanism.

Fig. 9 is also a view similar to Fig. 7 but shows the bottle loading apparatus in retracted position and the bottle lowering mechanism in its lowered position with the plurality of bottles being deposited into a carton.

Figure 10:
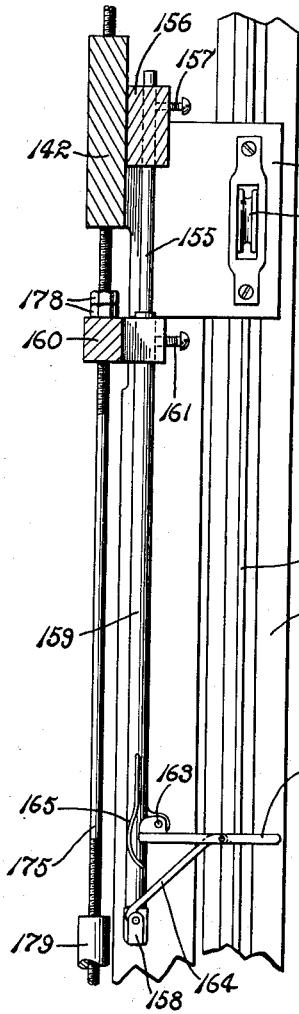

Fig. 10 is a further enlarged, fragmentary, vertical, longitudinal sectional view through the bottle loading mechanism of the casing machine in its raised position to receive bottles thereon, as viewed from line 10—10 in Fig. 4 of the drawings.

Figure 11:
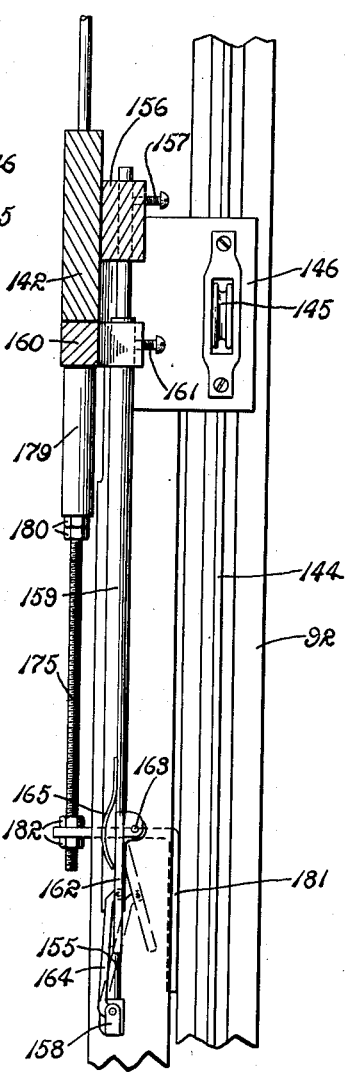

Fig. 11 is a view similar to Fig. 10 but shows the bottle lowering mechanism in its lowermost position and actuated to release bottles previously supported thereon.

Figure 12:
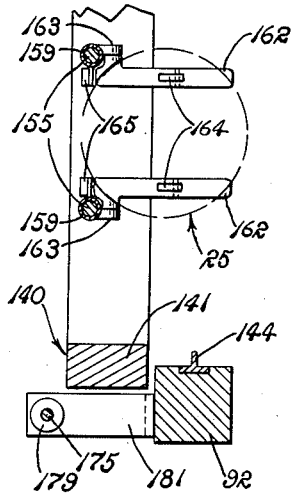

Fig. 12 is a fragmentary, horizontal, longitudinal sectional view through the bottle lowering mechanism as taken along line 12—12 in Fig. 4 of the drawings.

Fig. 13 is an enlarged fragmentary, horizontal, sectional view through a case locating device shown in a first position initially to locate a case for insertion of bottles therein.

Fig. 14 is a view similar to Fig. 13 but shows the locating device in a following position regulating stepped progression of a case.

Fig. 15 is a view similar to Fig. 13 but shows the locating device in a final position of its cycle of operation.

Figure 2:
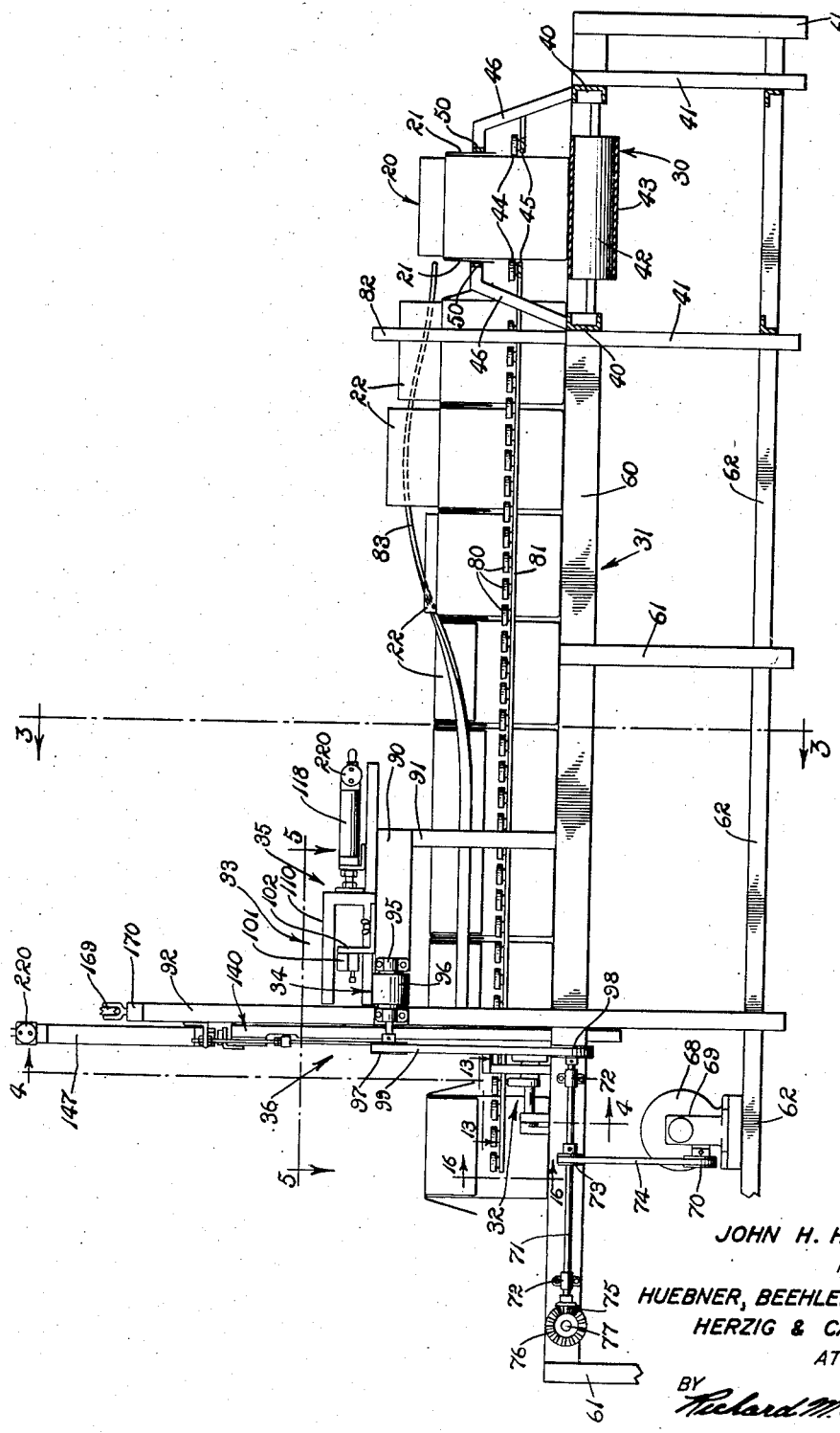
Fig. 2 is a side elevational view of the casing machine with the delivery conveyor thereof in vertical transverse section.
Figure 3:
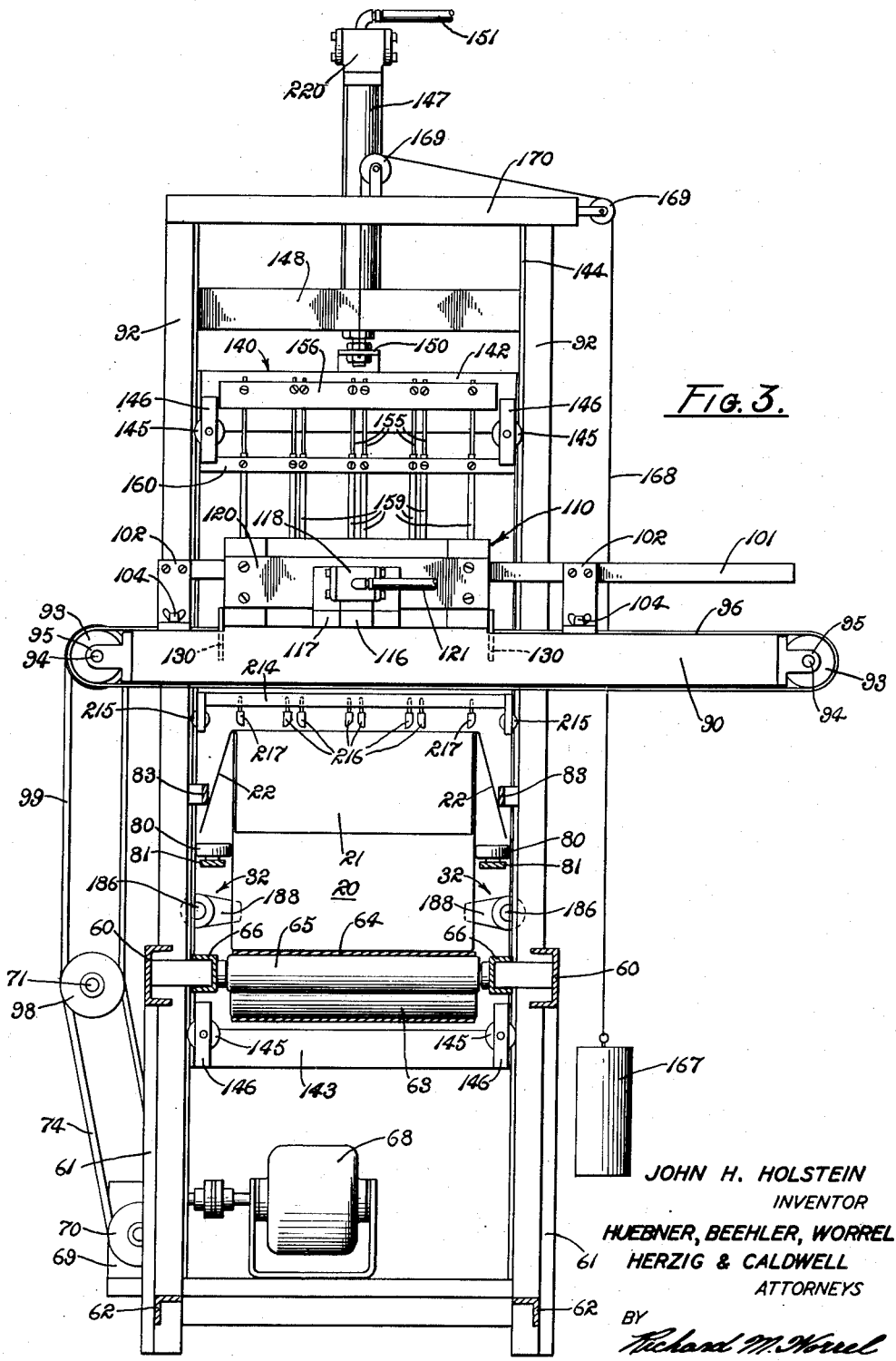
Fig. 3 is an enlarged vertical transverse sectional view through the casing apparatus, as taken along line 3—3 in Fig. 2.

Fig. 16 is a vertical, transverse, section through a portion of the casing machine, as taken along line 16—16 in Fig. 2 of the drawings, illustrating the case locating device in elevation and in one of its rotative positions.

Fig. 17 is a view similar to Fig. 16 but shows the case locating device rotated 120° to a subsequent position to that illustrated in Fig. 16 to permit the case conveyor to advance a case from one position to a subsequent position.

Fig. 18 is an end elevational view looking at the forward end of one of the case locating devices showing the arm for initially locating a case in its position in full lines engaging the side of a filled and released case and in dashed lines in a position released from case in position to engage a following case.

Figure 19:
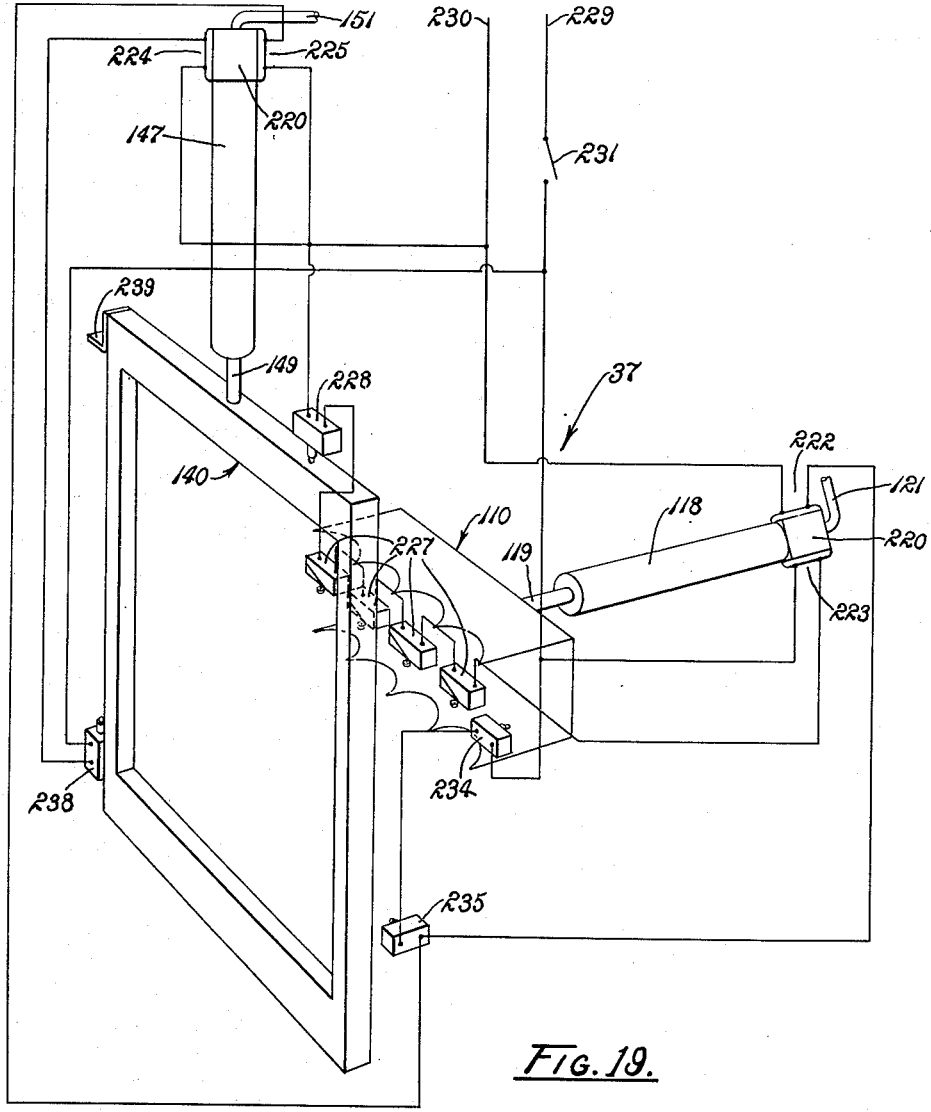

Fig. 19 is a diagrammatic illustration of the electrical circuit and pneumatic systems for the sequential operation of the casing machine demonstrating the synchronous interdependence thereof.

Referring in greater detail to the drawings:

The casing machine of the present invention is adapted to encase a large variety of articles and materials but in the present instance is shown in a form adapted to insert bottles into rectangular cartons, indicated generally by the reference numeral 20, made of corrugated board or other suitable material. Each carton 20 is formed with a pair of rectangular side flaps 21 along opposite top edges thereof which are scored at the junction with the carton so that they are easily foldable relative thereto. Each carton is also provided with a pair of end flaps 22 similar to side flaps 21. Such cases or cartons are frequently divided into separate compartments 23 by means of longitudinally and transversely extending vertically located partitions 24.

As illustrated, each carton is adapted to receive twelve bottles, which are indicated generally by the reference numeral 25, in three rows of four bottles each. Obviously the present invention is not limited to use with the carton form nor article to be encased that are shown and described.

The packaging machine comprises a plurality of sub-assemblies including a delivery conveyor 30, and a case conveyor 31 at right angles to the delivery conveyor 30, on which cartons 20 or other containers are moved to a pair of carton locating devices 32. The carton locating devices 32 retain the cartons on the main conveyor 31 in proper positions for the reception of bottles 25 therein from a bottle handling mechanism indicated generally by the reference numeral 33. The bottle handling mechanism 33, employs a bottle conveyor 34 for transporting bottles from a remote position to a position immediately adjacent a bottle loading apparatus 35. This bottle loading apparatus is operable to remove a plurality of bottles from the bottle conveyor 34 onto a bottle lowering mechanism or elevator, indicated generally by the reference numeral 36. The elevator is operable to lower bottles from the bottle handling mechanism downwardly into selected compartments of the carton 20 and gently to release the bottles therein. The casing machine is provided with a control system indicated generally by the reference numeral 37 in Fig. 19 of the drawings. The foregoing enumerated sub-assemblies indicated generally by the reference numerals from 30 to 37 inclusive, are cooperatively integrated and their functions synchronized speedily and gently to encase bottled beverages and the like.

*Delivery conveyor 30*

The carton delivery conveyor 30 is conveniently constructed by providing a fabricated frame 38 which is supported on a plurality of vertically extending legs 41. A pair of drums 42 are rotatably mounted in spaced relationship longitudinally of the secondary conveyor 30 on horizontal transverse axes, one only of the drums being shown in the drawing. An endless horizontal belt 43 extends circuitously around the pair of drums 42 and means, not shown, are provided for rotating the drums and advancing the upper run of the endless belt in a direction toward the main conveyor 31 or in the direction indicated by the arrow in Fig. 1 of the drawings. Rectangular cartons are placed with their open sides upwardly on the belt 43 with the length of the carton located longitudinally of the belt. These cartons are maintained transversely on the belt 43 by providing a plurality of spaced rollers 44 which engage opposite sides of the carton and are rotatably mounted on vertical axes on a pair of bars 45 along opposite sides of the belt 43. The bars 45 are secured to supports 46 attached upwardly on the frame 40 of the conveyor 30.

Means are attached to the secondary conveyor frame for folding the side flaps of each carton downwardly and outwardly of the carton. This means comprises a pair of side flap plows 50 located symmetrically longitudinally of the frame 40. Each of the flap plows is provided with a forward terminal end 51 located closely adjacent to the top side of the box and positioned relatively narrower than the width of the carton so that as the cartons move along the delivery conveyor 30, the undersides of the side flaps are engaged by the forward ends of the flap folders. Rearwardly of the forward ends, the plows are bowed outwardly and upwardly at 52 to move the side flaps outwardly. Adjacent to the conveyor 31, the plows 50 are bent to lie closely adjacent to the sides of the carton, as at 53. The plows 50 preferably extend over a portion of the conveyor 31 to maintain the side flaps in downwardly folded condition until received under end flap plows presently described or engaged by a preceding or following carton.

Carton conveyor 31

The carton conveyor 31 is provided with a frame structure 60 conveniently supported on a plurality of vertical supporting legs 61. The frame 60 is strengthened between the legs 61 by means of a plurality of horizontally extending braces 62. A pair of drums 63 are rotatably mounted in the frame 60 adjacent to each end thereof on a horizontal axis. An endless belt 64 extends circuitously around and between the drums 63 for the support of cartons thereon for movement to the bottle handling mechanism 33. The endless belt 64 is further supported by a plurality of spaced, axially horizontal, rollers 65 rotatably mounted between a pair of parallel channel members 66.

Figure 1:
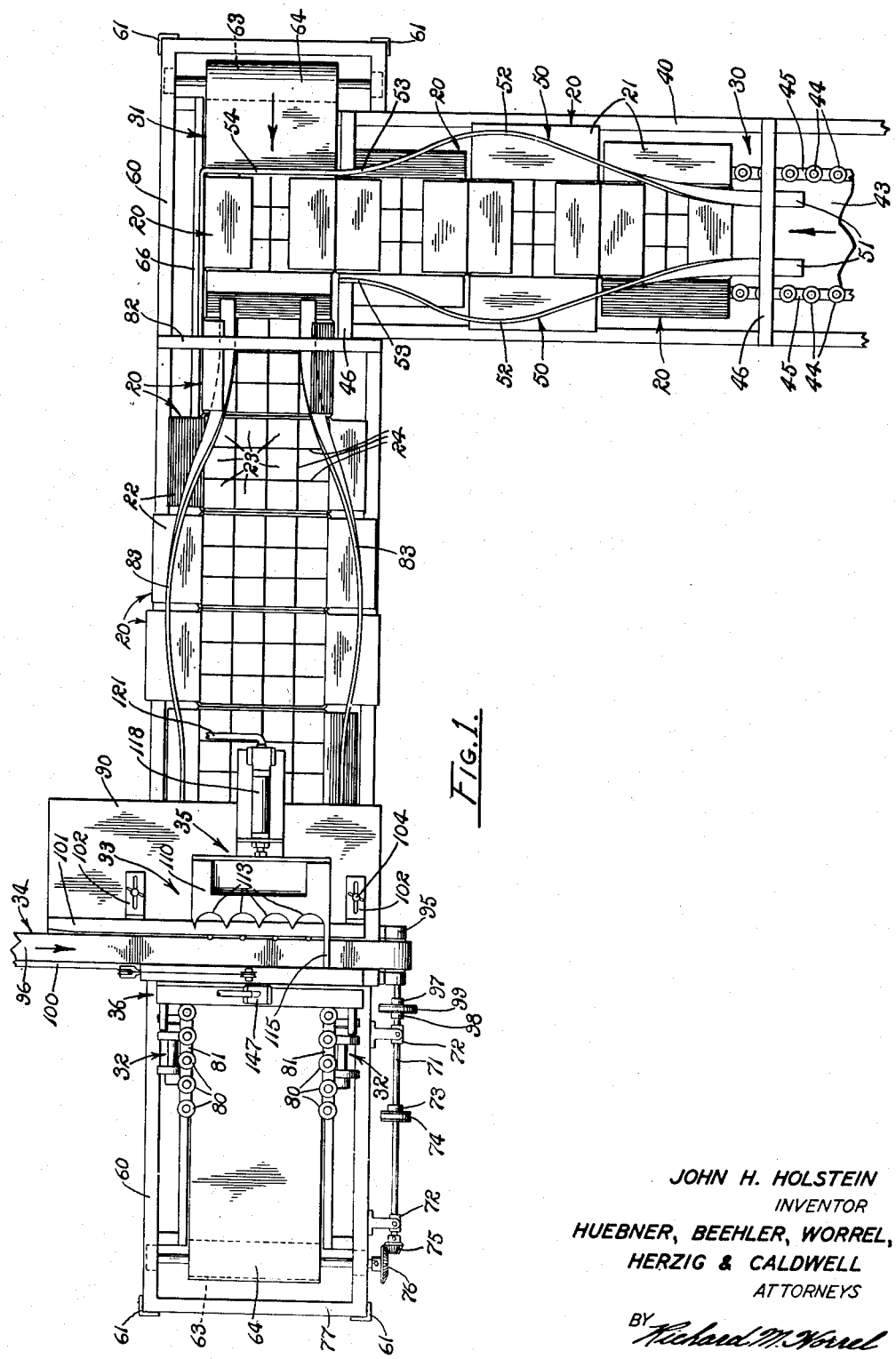
Fig. 1 is a top plan view of a casing machine employing the principles of the present invention and fragmentarily showing a delivery conveyor utilized therewith.

The conveyor belt 64 is traveled from the delivery conveyor 30 toward the bottle handling mechanism 33, as indicated by the arrow in Fig. 1 of the drawings. The driving means comprises an electric motor 68 supported on and between oppositely located stretchers 62, the motor having driven connection with a transmission 69. A pulley 70 is attached to a shaft of the transmission. A drive shaft 71 extends axially longitudinally of the frame 60 and is rotatably mounted in a pair of spaced bearings 72 with a pulley 73 fixed axially to a mid-portion of the shaft. An endless V-belt 74 extends circuitously around the pulleys 70 and 73 so that the drive shaft 71 is rotatably driven by the electric motor 68. A bevel gear 75 is attached to the forward terminal end of the drive shaft 71 and an intermeshing bevel gear 76 is attached to a shaft 77 on which one of the drums 63 is mounted. Thus, on energization of the electric motor 68, the main conveyor 31 is driven to advance cartons from the secondary carton conveyor 30 past the bottle handling mechanism 33.

The cartons or cases 20 are maintained transversely of the main conveyor belt 64 as they are moved thereby by providing a plurality of rollers in longitudinal alignment adjacent each edge of the endless belt 64, each set of which is rotatably mounted on a bar 81. Each bar 81 is secured to supports 82 formed integrally with the carton conveyor frame 60. End flap plows 83, similar to the side flap plows 50, are provided symmetrically of the carton conveyor 31 and serve to open the end flaps outwardly and downwardly so that by the time the carton locating device 32 is reached the carton is fully opened and preconditioned to receive bottles.

Bottle conveyor 34

The bottle conveyor 34 is a portion of the bottle handling mechanism 33 and is provided to move bottles from a filling and capping or corking station to a collection station. A rectangular horizontal table 90 is conveniently supported on a pair of legs 91 attached to the conveyor frame 60 and on a pair of vertical posts 92 which extend from a supporting floor upwardly to a distance appreciably above the table 90 at opposite sides of the conveyor 31. A pair of drums 93 are rotatably supported in spaced relation for travel of the bottle conveyor transversely of the carton conveyor 31. The drums 93 are supported on shafts 94 each rotatable in a pair of bearings 95 secured to a portion of the table 90. An endless belt 96 extends circuitously around and between the pair of drums 93 and is motivated so that its upper run moves toward the conveyor 31, in the direction of the arrow shown in Fig. 1.

The belt 96 is conveniently driven by securing a pulley 97 to one of the shafts 94 on which one of the drums 93 is mounted. Another pulley 98 is secured to the drive shaft 70 and an endless V-belt 99 extends circuitously around the pulleys 97 and 98 so that when the electric motor 68 is energized the belt 96 of the bottle conveyor 34 is in driven connection with the drive shaft 71.

As the endless belt 96 is moved in the direction indicated with bottles to be cased supported thereon, the bottles are guided and maintained on the belt 96 by means of a fixed guide 100 closely adjacent to one edge of the belt and secured to one edge of the table 90. The bottles are confined at the opposite edge of the endless belt by means of an elongated guide 101 which extends transversely of the table 90. This second guide 101 is adjustable transversely of the belt 96 so as to accommodate a single row of bottles or other merchandise of various widths. This adjustment is accomplished by securing a bracket 102 closely adjacent to each end of the guide 101, a portion of which bracket is slotted at 103. A thumb screw is passed through the slotted portion of each of the brackets 102 and threaded into the table 90 for tightening against its respective bracket.

Bottle loading apparatus 35

A loader is provided for removing bottles or other merchandise from the bottle conveyor 34 onto the bottle lowering mechanism 36 including a ram 110 which is mounted on the table for reciprocal movement transversely of the bottle conveyor 34. The ram 110 is constructed with a pair of transversely extending vertically spaced plates 111 which are maintained in spaced relationship by means of a spacer 112 extending between respective edges of the plates. The ram 110 is located immediately above the table 90 with the lower plate of the spaced plates 111 movable immediately above and across the upper surface of the bottle conveyor. The forward edges of both of the plates 111 are formed with equally spaced bottle receptacles 113 of semi-circular form on vertical axes spaced transversely of the machine substantially equal to the outer diameter of bottles to be moved thereby. Pointed guide projections 114 are formed between adjacent receptacles 113 for guiding the bottles to proper spaced relationship by ram engagement for insertion into a carton.

A pair of vertically spaced stop fingers 115 extend from the plates 111 of the ram 110 toward the bottle elevator 36 transversely of the bottle conveyor 34 at the side of the bottle elevator 36 opposite that from which bottles carried by the conveyor approach. When the ram is in retracted position, as shown in Fig. 5, the stop fingers 115 limit the movement of bottles supported on the bottle conveyor belt 96 so that the required number of bottles are collected between the ram and the bottle lowering mechanism.

The ram 110 is provided with a rearward extension 116 longitudinally of the machine toward the receiving end of the main carton conveyor 31 which is slidably located between a pair of slide guides 117 attached to a portion of the table 90. The guides constrain the ram to reciprocal movement transversely of the bottle conveyor.

The ram 110 is conveniently pneumatically driven to extended and retracted positions by means of an air cylinder 118 mounted on the rearward ends of the guides 117. The cylinder has a pneumatically movable piston rod 119 attached at its outer end to the central portion of a spanner plate 120 secured to the spacer 112 of the ram. An air conduit 121 is pneumatically connected to the outer end of the air cylinder for pneumatic actuation of the air cylinder and to a source of air or gas under pressure through a valving mechanism presently more fully described.

As bottles or the like are carried into the space between the bottle loading apparatus 35 and the bottle lowering mechanism 36, they are halted, in their movement on the conveyor belt 96, by engagement with the stop fingers 115. The bottles are guided and maintained in alignment longitudinally of the belt along one side by means of the adjustable guide 101. Continued movement of the bottle conveyor belt frictionally moves the belt under the supported bottles. This tends to bunch the bottles. Means is provided for precluding inadvertent transverse movement of the bottles from the bottle conveyor belt into the bottle lowering mechanism 36. This means comprises a retainer plate 126 which has a vertical portion thereof extended above the upper surface of the bottle conveyor belt 96 between the conveyor belt and the bottle lowering mechanism 36. The retainer plate 126 is vertically movable so that it may be retracted from the upwardly extended position between the belt and the bottle lowering mechanism by pivotally mounting the retainer plate at 127 to the under side of the table 90. A compression spring 128 is located between a portion of the retainer plate and the table 90 which constantly urges the retainer plate to its upwardly projected position. The retainer plate is automatically retracted when the ram 110 of the bottle loading apparatus 35 is extended to move bottles from the bottle conveyor belt 96 onto the bottle lowering mechanism 36 by a pair of rollers 129 mounted on and extending from opposite transverse edges of the retainer plate 126. A vertical longitudinally extending cam plate 130 is secured to opposite transverse longitudinal sides of the ram 110 and project downwardly therefrom through slots 131 formed through the table 90 longitudinally of the machine. The rear edge of each of the cam plates 130 is formed with an angular cam surface 132 and a horizontal dwell 133 for desired actuation of the retainer plate 126. On movement of the ram 110 to remove bottles from the conveyor belt 96 onto the lowering mechanism 36, the cam plates 130 engage the rollers 129 and the angular cam surfaces 132 promptly lower the rollers 129 retracting the retainer plate 126 to its lower position from the path of movement of the bottles. The dwells 133 maintain the retainer plate in retracted position as long as the head 110 is in extended position. When the head 110 returns to its rest or retracted position, the cam plate 130 disengages the rollers 129 and permits the retainer plate to move to its upwardly extended position as urged by the spring 128.

*Bottle lowering mechanism or elevator 36*

The bottle elevator carries bottles delivered thereto by the loader downwardly and deposits the same in compartments in a carton 20 aligned therebelow. The elevator is provided with a rectangular frame 140 having a pair of vertically extending parallel side members 141, a horizontal top member 142 interconnecting the upper ends of the side members 141, and a horizontal bottom member 143 interconnecting the lower ends of the side members 141. The frame is vertically supported on the posts 92 for elevational movement by securing a track 144 to the inner face of each of the posts and by attaching a pair of rotatable grooved casters 145 to each vertical side member 141 of the rectangular frame. The grooved casters are each secured to their respective side members 141 by means of a block 146 which extends transversely from the rectangular frame 140.

The frame 140 is elevationally reciprocated on the vertical posts 92 by an air cylinder 147 rigidly mounted on a bracket 148 secured between the vertical posts 92. A piston rod 149 of the air cylinder is anchored to an angle member 150 which in turn is attached to the horizontal top member 142 of the rectangular frame 140. An air conduit 151 is pneumatically connected to the upper end of the air cylinder 147 and to a source of air or gas under pressure by way of a valving mechanism so that the piston rod thereof may be retracted or extended to move the rectangular frame 140 to a raised position for the reception of bottles and to a lowered position to deposit bottles in cartons.

The frame 140 mounts a plurality of vertically extending support rods 155 by means of horizontally extending attaching blocks 156 secured to one face of the horizontal top member 142 of the rectangular frame. The support rods extend through vertical openings in the attaching block and are held longitudinally therein by means of a screw 157 threadedly extending radially into each opening. The support rods are mounted in pairs and each pair is located transversely symmetrically of the desired location of one of the bottles as determined by predetermined carton positioning. In the present instance, four pairs of support rods are provided in substantial alignment transversely of the machine. A rectangular head 158, having a lower end portion beveled to assist in centering cartons, is secured to the lower end of each of the support rods 155. Sleeves 159 appreciably shorter than the rods are slidably located on the support rods. The upper ends of the sleeves 159 are attached to a common bar 160 for unitary movement thereof. Each sleeve passes vertically through an opening in a portion of the bar 160 and is held longitudinally therein by means of a screw 161 threaded diametrically into each of the openings. A bottle supporting finger 162 is pivotally mounted at 163 near the lower end of each of the sleeves 159 on a horizontal axis. As shown in Fig. 12, the fingers of each pair are offset toward each other to provide dependable bottle support and so that the fingers may fold back alongside their respective sleeves 159. Each pair of bottle supporting fingers mounted on pairs of sleeves 159 are in effect a hinged, split, or divided platform or fork for the temporary support of bottles thereon. A link 164 pivotally interconnects each head 158 with a mid-portion of its respective bottle supporting finger 162. The ends of the links are preferably slightly hooked, as shown in Fig. 11 so that the fingers and links may compactly retract to pass bottles deposited thereby. Inasmuch as it is possible for bottles to collapse the fingers and their links past alignment, leaf springs 165 are mounted on the sleeves and urge the fingers and links outwardly, as shown in dashed lines in Fig. 11, upon passing upwardly by deposited bottles. With each support rod 155 and its respective sleeve 159 in their normal position, as illustrated in Fig. 10 of the drawings, the bottle supporting fingers 162 are horizontally extended toward, and substantially at the same level as, the conveyor belt 96 for the reception of bottles thereon from the bottle conveyor. In the lowermost position of the rectangular frame 140 the support rods 155 of the sleeve 159 are slid longitudinally on the support rods 155, by a mechanism hereinafter more fully described, to the position as illustrated in Fig. 11 of the drawings. In this position, the relative locations of the support rods and their respective sleeves depress the support fingers 162 to downwardly extending positions removing support of the bottles so that they gravitate into the compartments. It will be apparent that the pivotal movement of the fingers permits the bottles gently and easily to slide therefrom. In this lowermost position of the rectangular frame 140, the heads 158 of the support rods extend downwardly into the compartments of the carton so that bottles supported previously on bottle supporting fingers 162 gravitate only a short distance to the bottom of the carton, and that slidably on the depressed fingers.

The vertically movable rectangular frame and the bottle-supporting members mounted thereon including the support rods 155, sleeves 159, and bottle supporting fingers 162 are counterbalanced so that they may more easily be moved vertically during the operation of the machine. This counterbalancing is accomplished by providing a weighted member 167 which is attached to the outer terminal end of a cable 168. The cable passes over a pair of pulleys 169 each of which are attached to a cross piece 170 mounted between the upper ends of the vertical posts 92. The inner end of the cable extends downwardly from one of the pulleys and is attached to the angle member 150.

Means are provided for moving the support rods 155 and their respective sleeves 159 relatively longitudinally so that the bottle support fingers 162 are positively moved either to bottle supporting positions or to bottle releasing positions. This means comprises a pair of stop rods 175 which extend vertically alongside each of the vertical posts 92 and are maintained axially vertically by brackets 148. The stop rod is preferably screw threaded substantially its entire length and nuts 176 are threaded thereon to engage the brackets 148 to maintain the stop rods in depending relation therefrom. The stop rods extend downwardly through openings 177 near the opposite terminal ends of the bar 160 and stops 178 are threaded onto each of the stop rods to engage the upper side of the bar upon upward movement thereof during movement of the frame through its upper limits of travel. A stop collar 179, of cylindrical form, circumscribes each of the stop rods 175 and each is maintained vertically on its respective stop rod by a pair of adjusting nuts 180 which engage the under side of the stop collars on which they are supported. On downward movement of the rectangular frame 140, the bar 160 makes contact with the upper side of the stop collars 179 while the rectangular frame 140 continues its downward movement, moving the sleeves 159 relatively on the support rod 155 and pivoting the bottle support fingers 162 to a downwardly directed bottle releasing position. By adjusting the vertical positioning of the stop collars 179, the moment of release of the bottles into compartments in a carton may be regulated. The lower end of each stop rod is secured by passing the same through openings in brackets 181 mounted on the vertical posts 92 and nuts 182 tightened thereagainst.

*Carton locating devices 32*

As each carton is moved on the main conveyor 31 to a position underneath the bottle handling mechanism 33, means are provided for locating each carton in three positions of stepped progression longitudinally of the bottle handling mechanism so that each of the three rows of four compartments in each carton is aligned with the elevator to receive bottles therein. The carton locating means comprises a pair of shafts 186 rotatably mounted in bearings 187 parallel to the conveyor 31. The bearings are attached to the channel members 66. The shafts extend horizontally and axially longitudinally of the machine, one at each transverse side of the endless belt 64 of the conveyor 31. A plurality of axially spaced radially extended stop arms are secured to each shaft 186 comprising a first position stop arm 188, a second position stop arm 189, and a third position stop arm 190. These stop arms are mounted on each shaft in 120° relation so that on each one-third of a revolution of the shafts 186 brings a successive pair of stop arms at opposite sides of the conveyor 31 into carton retaining position for stepped progression of the cartons along the belt 64 passing thereunder. The second and third position stop arms 189 and 190 are rigidly mounted on their respective shafts 186 but the first position stop arm 188 is articulated for pivotal movement in its plane of rotation and spring loaded so that when a filled box or carton is still in position below the bottle handling mechanism, the first position stop arm may engage the sides of the filled carton and snap in position to stop the subsequent box in its initial or first position to receive bottles as the filled carton moves from the first position stop arm. To mount the first position stop arm in a spring loaded manner a block 191 is fixed to each shaft 186 with the first position stop arm 188 freely rotatable between the block 191 and a collar 192 secured to the terminal end of each shaft. A helical tension spring 193 is anchored at 194 to each first position stop arm 188 and at its opposite end is anchored at 195 to each block 191 against a stop pin 196 extending from each block 191. The stop arms are rotatable in a direction with the upper portion thereof rotatable inwardly and when the first position stop arm engages the filled carton it lags in the direction of rotation while the block 191 continues to the desired positioning of the stop arm with the spring 193 tensioned to urge the first position stop arm to its intended position. After the filled carton moves from between the first position stop arms they snap to the desired position to locate a following empty carton in its initial position for the filling of its first row of compartments.

The means for rotating each of the shafts 186 includes a star wheel 200, shown in detail in Figs. 16 and 17, secured to each of the shafts. The star wheels provide detent receptacles 201 at 120° intervals opened rearwardly relative to the direction of rotation of each shaft. A guide surface 202 is formed between each recessed portion of each star wheel for purposes hereinafter more fully described. The star wheels are rotated periodically by a pair of levers 203 each of which is pivoted as at 204 to the horizontal top member 142 of the frame 140. The levers 203 are supported in pendent relation on their pivots and are urged toward each other by means of a tension spring 205 interconnecting portions of the levers. A detent 206 is attached in right angular relation to the lower end of each of the levers 203 and is drawn against the star wheel by the spring. The detents 206 are guided during their elevational movement with the frame by an outwardly and downwardly directed cam 210 provided adjacent to each bearing 187. The cams are recessed at 211 in alignment with the circuitous travel of the receptacles, provided with an arcuate portion 212 concentrically of their respective shafts and is relieved at 213 below the concentric portion thereof to a substantially erect dwell portion. On downward movement of the frame 140, each detent 206 follows the outline of its cam 210 and glides freely over the guide portions 202 of the star wheels until the follower is located appreciably below the star wheels. On upward movement of the frame 140, each detent engages a corresponding recessed portion 201 of its star wheel and rotates the same 120° subsequent to which it disengages its star wheels and thereafter follows its respective cam. With the stop arms 188, 189, and 190 located at 120° intervals and with the detents rotating each shaft 186 120° each time the frame is elevated, the stop arms are brought successively into positions restraining the cartons to uniform stepped progression so that the three rows of compartments in each box are filled with bottles from the bottle handling mechanism 33.

In most instances the cartons and their partitions are located properly transversely of the conveyor 31 so that when the rods 155 are lowered the heads 158 properly straddle the partitions and avoid the ends of the cartons without jamming the upper edges of the partitions or the upper edges of the ends of the carton. Further to insure positive positioning, a horizontal auxiliary frame 214 is mounted for vertical movement between the vertical posts 92 by mounting a pair of vertically spaced grooved wheels 215 at spaced ends of the auxiliary frame engagd to the tracks 144. The auxiliary frame also mounts a plurality of dependent headed spring fingers 216 and 217. The fingers 216 are mounted in adjacent pairs spaced to engage opposite sides of the partitions 24 extended transversely of the cartons 20. The spring fingers 217 are located outwardly of the fingers 216 and engage the inner surfaces of the ends of the cartons. The fingers extend arcuately downwardly and the heads thereof are cam shaped so that as the auxiliary frame 214 is lowered the partitions and carton ends are resiliently urged into place. The auxiliary frame 214 and its supported fingers are moved vertically by providing a pair of lifter brackets 218 attached to each inner face of the vertical side members 141 of the bottle elevator frame 140. Whenever the frame 140 is in its upper position the lifter brackets engage the auxiliary frame 214 and carry the same to raised position above the cartons. Whenever the frame 140 is lowered, the auxiliary frame gravitationally descends and the fingers 216 and 217 extend into the cartons to perform their intended functions.

Synchronous control system 37

The cylinders 118 and 147 may take any suitable form but are conveniently of a well known type having control valves 220 integral therewith, as represented in Fig. 19. Air or gas under pressure is supplied to the control valves of the cylinders by pneumatic conduits 121 and 151 connected to any suitable source of pneumatic pressure, not shown. The cylinder 118 has a pair of electrical contacts 222 which operate the control valves within the cylinder pneumatically to retract the piston rod when an electrical potential is applied thereto. The cylinder 118 also provides a pair of electrical contacts 223 which control the valves therein pneumatically to extend the piston rod when an electrical potential is applied. Similarly the cylinder 147 has a pair of retraction electrical contacts 224 and a pair of extension contacts 225 which function as described for the contacts 222 and 223. The internal structure of the control valves 220 and the electrical means by which they are actuated are of a well known type and not described in detail herein, there being several suitable commercial forms generally available.

A bottle detecting switch is positioned in each of the bottle receptacles of the ram 110 and are conveniently mounted on the underside of the adjustable guide 101. A normally opened elevator detector switch 228 is mounted on the bracket 148 in a position to be engaged and closed by movement of the frame 140 to its upper limit. The extension contacts 223 of the cylinder 118 are electrically connected in series with the gang of bottle detecting switches 227 and the elevator detector switch 228 between opposite poles of a source of electrical energy represented at 229 and 230. A master control switch 231 is provided in the circuit described for purposes of disconnecting the same from the source of electrical energy. It will be apparent that when there is a bottle in each of the receptacles 113 and the frame 140 is in elevated position, the gang of bottle detecting switches 227 and the elevator detector switch 228 are closed electrically energizing the contacts 223 and extending piston rod 119 from the cylinder 118 so that the ram 110 shoves the bottles located in its receptacles onto the bottle support fingers 162 held in proper position by the elevational positioning of the frame.

A normally open ram detector switch 234 is mounted on the table 90 in a position to be engaged and closed by the ram 110 when the ram is in its forwardmost position placing the bottles located in its receptacles 113 onto the support fingers 162. A normally open carton detector switch 235 is mounted on the frame 69 in substantially vertical alignment with the bottle lowering mechanism 36 where it is engaged and closed by the positioning of a carton in proper place to receive bottles. The ram detector switch 234 and the carton detector switch 235 are connected in electrical series with the extension contacts 225 of the cylinder 147 between the poles 229 and 230 of the electrical source. Thus, when the ram is in its forwardmost position having loaded the bottle lowering mechanism and a carton is in proper place to receive bottles, the cylinder 147 is pneumatically operated to lower the frame 140 and thus the bottles into their proper places in the carton.

A normally open switch 238 is mounted on one of the posts 92 in a position engageable by a switch actuating bracket 239 borne on the elevator frame 140. The bracket 239 closes the switch 238 at the lower limit of travel of the frame 140. The switch 238 is electrically connected in series with the retraction contacts 224 of the cylinder 147 between the poles of the electrical source. When the frame 140 has descended to its lower limit of travel, the switch 238 is closed and the frame immediately returned to its elevated position by retraction of the piston rod 149 into the cylinder 147. It is obvious in Fig. 19 that at no time can the switches 228 and 238 both be closed.

The retraction contacts 222 of the cylinder 118 are electrically connected in series with the carton detector switch 235 and the ram detector switch 234 so that the ram 110 is pneumatically retracted as soon as it has reached its forwardmost position as long as there is a carton in place to receive bottles from the elevator or bottle lowering mechanism 36.

*Operation*

The operation of the casing machine of the present invention is clearly apparent and briefly summarized at this point. With the delivery conveyor 30, carton conveyor 31, and bottle conveyor 34 in operation, as previously described, cartons 20 are placed on the delivery conveyor with their open sides up. As the cartons are moved longitudinally of the belt 43 the side flap plows fold the side flaps 21 of the cartons outwardly and downwardly. The belt 43 discharges the cartons 20 onto the belt 64 which carries the cartons sidewardly toward the bottle lowering mechanism, the end flap plows 83 fold the end flaps 22 of the cartons outwardly and downwardly so that the compartments 23 are conveniently available for the deposit of bottles therein.

The first carton is stopped in a position for the deposit of bottles in the first row of compartments thereof by engagement with the first stop arm 188. Although the belt 64 continues to travel thereunder, the carton is dependably retained in position until the locating device 32 is rotated to move the first stop arm 188 out of the path of carton travel and the second stop arm 189 into said path of travel.

Filled and capped or corked bottles are fed onto the belt 96 by a suitable means, not shown, and are carried by the belt to the bottle loading apparatus 35. The stop fingers 115 collect the bottles at a collection station intermediate the ram 110 and the bottle elevator 36. The upper surface of the belt is preferably lubricated so that the pressure against the fingers 115 by the bottles under which the belt continues to pass is minimized. The guides 100 and 101 and the retainer plate 126 confine the bottles to alignment on the belt.

When there is a bottle in each of the receptacles 113 of the ram 110, the bottle detecting switches 227 are closed. It will be recalled that the frame 140 is always returned to its uppermost position and thus the elevator detector switch 228 is also closed and the ram thrust forwardly transversely of the belt 96 automatically retracting the retainer plate 126 and the bottles are positioned on the support fingers 162. It is significant that the arrangement of the receptacles 113 is such that as the bottles are thrust onto the fingers they are properly spaced for reception into compartments 23 of the cartons 20.

As shown in Fig. 10, as the frame 140 descends the heads 158 of the support rods 155 facilitate precise positioning of the cartons 20 through the engagement of the beveled edges thereof with the cartons. During the lowering movement of the frame 140, the fingers 162 are retained in horizontal position. Just short of the lower limit of travel of the frame, the bar 160 mounting the sleeves 159 strikes the stops 178 and the sleeves are held against further downward movement as the rods 155 continue downwardly a short additional distance. As shown in Fig. 11, the relative movement of the rods and sleeves causes the links 164 to draw the platforms into downwardly inclined position from which the bottles gently slide into the bottoms of the compartments 23.

At the lower limit of travel of the rods 155, the frame 140 closes the switch 238 and the frame 140, rods 155 and sleeves 159 are moved upwardly withdrawing the support fingers 162 from the carton. It will be seen in Fig. 12 that the spacing of the pairs of fingers readily permits passage upwardly by the inserted bottles when in folded position. As the frame 140 approaches its upward limit of travel, the bar 160 engages the stop nuts 178 precluding further upward movement of the sleeves 159 as the rods continue upwardly with the frame. This relative movement of the sleeves and rods positively returns the fingers 162 to horizontal position, as shown in Fig. 10 for the subsequent reception of bottles thereon in the manner previously described.

The ram 110 having been retracted as soon as the elevator 36 is loaded, bottles accumulate at the collecting station as the elevator inserts the bottles into the cartons. If the gang of bottle detecting switches 227 are all closed by adequate accumulation of bottles in the receptacles 113, the return of the frame to its upper limit closes the detector switch 228 and the cycle just described is repeated. During reciprocation of the ram, the edge thereof opposite from the stop fingers 115 temporarily blocks bottle travel to the collecting station.

As evident in Figs. 16 and 17, each time the frame 140 is elevated from its lower limit of travel, the detents 206 concurrently engage in the recess 201 of their respective star wheels 200 and each of the shafts 186 is rotated 120°. Such rotation removes corresponding stop arms from carton retaining position and permits the carton to advance one step in the progression for the filling of a successive row of compartments 23 therein. When the third stop arms 190 are rotated from carton engagement, a completely filled carton is released for continued travel on the carton conveyor 31 to any convenient position for removal. Simultaneously the first stop arms 188 are brought into carton retaining position for the insertion of bottles in the first row of compartments of a succeeding carton.

The casing machine is fully automatic in its operation and obviously may be adapted to the insertion of various types of articles into innumerable varieties of cartons, cases, packages, crates, and the like. The cartons are dependably and accurately located for loading purposes. The arrangement of the bottle detecting switches 227 insures the complete loading of each compartment in the cartons. If all of said switches are not closed the elevator 36 will not operate and the entire mechanism is stopped. The partition locaters 216 and the carton end locaters 217 facilitate precise positioning of the partitions 24 and cartons 20.

The casing machine is fast in operation and obviates scratching of the bottles and damage to the labels affixed thereto experienced in conventional casing machines. The bottles are handled so gently that the contents thereof are in no way damaged and even the most highly carbonated beverages can be mechanically placed in their cases without danger of explosion.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. In a casing machine adapted to deposit articles in cases therefor, the combination of a pair of transversely related elevationally spaced substantially horizontal continuously traveled conveyors, the upper conveyor being adapted to deliver articles to a collection station above the lower conveyor and said lower conveyor being adapted to deliver cases successively to a loading station, a platform mounted adjacent to the upper conveyor at the collection station for reciprocal elevational movement above the loading station, case locating means mounted adjacent to the lower conveyor adapted periodically to retain cases borne thereby at the loading station, said locating means having controlled connection to the platform whereby upward movement of the platform causes release of the cases for continued travel on the conveyor and preconditions said locating means for successive case retention under the platform, a loader mounted for reciprocal movement transversely of the upper conveyor at the collection station in horizontal alignment with the platform, a synchronous drive linkage for the locating means, platform, and loader reciprocating the loader to transfer articles from the upper conveyor to the platform when the elevator is in raised position and lowering the platform into a case and withdrawing the same therefrom while the loader is retracted and the locating means positioned to retain a case under the platform, the platform being pivotally mounted for reciprocal movement between a horizontally extended position and a downwardly directed position, and control means responsive to elevational movement of the platform horizontally positioning the platform at the collection station, maintaining the platform in horizontal position during downward movement thereof, and pivoting the platform downwardly at the loading station.

2. An apparatus for inserting articles downwardly into upwardly open containers comprising a continuously traveled conveyor adapted to receive containers thereon, a continuously traveled article conveyor supported transversely above the container conveyor, a stop mounted transversely of the article conveyor above the container conveyor to collect thereagainst articles borne by the conveyor, a platform mounted adjacent to the point of article collection for reciprocal elevational movement above the container conveyor from a position horizontally aligned with the article conveyor and a position adjacent to the container conveyor, said platform being pivotal between a horizontal position and a substantially vertical position, control means horizontally positioning the platform at its upper limit of travel and during downward movement and substantially vertically positioning the platform at its lower limit of travel and during upward movement, a loader mounted for reciprocal horizontal movement transversely of the article conveyor at the point of article collection adapted to push collected articles onto the platform, locating means mounted adjacent to the container conveyor engageable with successive containers to locate the containers for reception therein of the platform and articles borne thereby and released for continued travel of the container in response to upward movement of the platform, and synchronous driving means elevationally reciprocating the platform in time spaced steps intermediate which the platform is maintained in elevated position at the point of article collection and reciprocating the loader to move articles from the conveyor to the platform intermediate said reciprocal movements of the platform.

3. A bottle casing machine comprising a substantially horizontal continuously traveled casing conveyor, a pair of locating means for casing borne by the conveyor mounted on opposite sides of said conveyor for rotation about axes substantially parallel to the conveyor and having axially spaced stop arms successively located above the conveyor upon rotation of the locating means to retain the casings in positions of stepped progression, a substantially horizontal continuously traveled bottle conveyor positioned above the casing conveyor and transversely related thereto, an elevator mounted adjacent to the bottle conveyor for vertical reciprocal movement to and from casings moved in stepped progression against the stop arms, said elevator having a substantially horizontal platform pivotally movable to downwardly tipped position at the lower limit of movement of the elevator, a stop positioned transversely of the bottle conveyor adjacent to the elevator to collect bottles for the loading of the elevator, a loader mounted for reciprocal horizontal movement transversely of the bottle conveyor in alignment with the conveyor for engagement with collected bottles and their movement onto the platforms of the elevator, a retainer plate mounted for reciprocal elevational movement laterally adjacent to the bottle conveyor between an upper position extended between the conveyor and the elevator in alignment transversely of the conveyor from the loader and a retracted position below the conveyor, and a control linkage interconnecting the loader and the retainer plate moving the retainer plate into retracted position in response to movement of the loader transversely of the conveyor toward the elevator and into its upper position in response to return movement of the loader.

4. A bottle casing machine comprising a delivery conveyor adapted to receive cases having upwardly open tops closeable by means of foldable side flaps and end flaps, a flap plow mounted above the delivery conveyor adapted to engage the side flaps and to fold them outwardly, a secondary conveyor in right angular relation to the delivery conveyor and adapted to receive cases therefrom, a flap plow mounted above the secondary conveyor adapted to engage the end flaps and to fold them outwardly while retaining the previously folded side flaps in outwardly folded positions, locating means mounted for rotation about an axis longitudinally of the secondary conveyor bearing a plurality of axially spaced stop arms successively located above the secondary conveyor to retain the cases in positions of stepped progression, an elevator mounted for elevational movement above the secondary conveyor adjacent to the stop means for movement to and from cases retained thereby, a bottle conveyor mounted transversely of the secondary conveyor adjacent to the elevator, a stop transversely disposed to the bottle conveyor adapted to collect bottles carried along the bottle conveyor, a loader mounted for reciprocal movement transversely of the bottle conveyor adjacent to the elevator having bottle receptacles formed therein adapted to space the collected bottles for casing insertion, and synchronous drive means adapted to move the loader across the bottle conveyor in response to the locating of a bottle in each of the receptacles therefor in the loader and raising of the elevator, adapted to lower the elevator and retract the loader in response to the positioning of a case to receive the elevator and bottles and extreme movement of the loader transversely of the bottle conveyor to load the elevator and adapted to raise the elevator from the casing in response to downward movement of the elevator to a predetermined limit.

5. A bottle casing machine comprising a continuously traveled casing conveyor, a continuously traveled bottle conveyor mounted above the casing conveyor, a pair of casing locating means mounted at opposite sides of the casing conveyor for rotation about axes substantially parallel to said conveyor providing a plurality of stop arms spaced longitudinally of the casing conveyor successively located above the casing conveyor to retain cases in positions of stepped progression for the receipt of bottles upon rotation of the locating means, an elevator positioned above the casing conveyor adjacent to the bottle conveyor, means mounting the elevator for reciprocal elevational movement in alignment with the casing positions as determined by the locating means, the elevator providing a platform mounted thereon for pivotal movement between substantially horizontal positions and downwardly directed bottle discharging positions, control means interconnecting the platform and the elevator mounting means positively positioning the platform horizontally at its upper limit of travel and during downward movement and downwardly directing the platform at its lower limit of travel and during upward movement, a stop mounted transversely of the bottle conveyor adjacent to the elevator to collect bottles passed therealong, a loader mounted for reciprocal movement transversely of the bottle conveyor in alignment with the elevator having bottle receptacles formed therealong adapted to receive bottles collected by the stop, means driving the loader across the bottle conveyor in response to upward positioning of the elevator and receipt of a bottle in each of the receptacles, means vertically reciprocating the elevator in response to reciprocal movement of the loader and the positioning of a casing in bottle receiving position by the locating means, and means rotating the locating means for stepped progression of the casings in response to upward movement of the elevator.

6. A bottle casing machine as specified in claim 5 having an auxiliary frame slideably supported on the elevator mounting means for independent elevational movement, dependent spring fingers borne by the auxiliary frame in positions adapted to engage and position divisions located within the bottle cases, and a bracket borne by the elevator engageable with the auxiliary frame during upper limits of the movement of the elevator to elevate the auxiliary frame and fingers above the casings.

7. A mechanism for lowering articles into restricted quarters comprising a frame mounted for reciprocal elevational movement between predetermined upper and lower limits of travel, a downwardly extended rod mounted on the frame, a sleeve slideably mounted on the rod in frictional engagement therewith tending to cause the sleeve elevationally to travel with the rod, a platform pivotally mounted on the sleeve for movement between a horizontal load retaining position and a downwardly extended load depositing position, a link pivotally interconnecting the rod below the sleeve and the platform at a position radially removed from the pivotal mounting thereof, a stop limiting downward movement of the sleeve with the rod to a position short of the limit of downward movement of the rod whereby continued downward movement of the rod draws the platform downwardly into load depositing attitude, and a stop limiting upward movement of the sleeve with the rod to a position short of the upward limit of movement of the rod whereby continued upward movement of the rod urges the platform into horizontal load retaining position.

8. A mechanism for lowering articles into restricted quarters and depositing the articles therein comprising an elongated substantially vertical support member mounted for reciprocal elevational movement, drive means vertically reciprocating the support member between predetermined upper and lower limits of travel, a sleeve mounted on the support member for slideable movement longitudinally thereof, a platform mounted on the sleeve for pivotal movement between a horizontally extended load receiving position and a downwardly directed load discharging position, resilient means mounted on the sleeve in platform engagement urging the platform from load discharging position, a link pivotally interconnecting the support member below the sleeve and the platform at a position radially removed from the pivotal mounting thereof, a stop limiting downward movement of the sleeve with the support member to a position short of the lower limit of travel of the member whereby the link draws the platform into load discharging position, and a stop limiting upward movement of the sleeve with the support member to a position short of the upward movement of the support member whereby the link urges the platform into horizontal position.

9. In a bottle casing machine, the combination of a frame mounted for reciprocal elevational movement between predetermined upper and lower limits, pairs of downwardly extended rods mounted in the frame, sleeves slideably mounted on the rods, elongated platform fingers pivotally mounted on the lower ends of the sleeves for movement between horizontal and downwardly directed positions, resilient means mounted on the sleeve in finger engagement urging the finger from downwardly directed position, links individually pivotally connected between the lower ends of the rods and the fingers mounted on the rods' respective sleeves, and stop means limiting upward and downward movement of the sleeves with the rods to positions short of the upper and lower limits of travel of the sleeves' respective rods.

10. In a casing machine, the combination of a pair of elevationally spaced transversely related substantially horizontal continuously traveled conveyors, means for stopping articles carried by the upper conveyor at a position directly above the lower conveyor, means for temporarily interrupting travel of containers on the lower conveyor at a position laterally adjacent to the upper conveyor, a platform, means pivotally mounting the platform for reciprocal elevational movement between a position horizontally aligned with the upper conveyor laterally adjacent thereto and a lower position within containers whose travel is temporarily interrupted on the lower conveyor, control means locating the platform in horizontal position at the upper limit of travel thereof and during downward movement into containers and pivoting the platform to a downwardly directed position at the lower limit of travel for return to the upper conveyor, and a pusher mounted for reciprocal movement transversely of the upper conveyor when the platform is in elevated position to slide articles from the upper conveyor onto the platform.

11. A mechanism for lowering articles into restricted quarters and depositing the articles therein comprising a frame mounted for reciprocal elevational movement between predetermined upper and lower limits of travel, a pair of laterally spaced support rods rigidly mounted in the frame and downwardly extended therefrom, a sleeve slidably mounted on each rod for movement longitudinally thereof having upper and lower end portions, a finger pivotally mounted on the lower end portion of each sleeve for movement between a horizontally extended position and a downwardly directed position between the rods, a link pivotally connected between the lower end portion of each rod and a mid portion of the finger pivotally mounted on said rod's respective sleeve, means mounted on the lower end portion of each rod limiting downward movement of its respective sleeve to a position causing the link mounted thereon to thrust its respective finger into substantially horizontal position, the interconnected links and fingers being pivotal to substantially aligned positions longitudinally adjacent to the rods between the rods and limiting the upward movement of the sleeves on their rods to predetermined relative travel, a leaf spring mounted on each sleeve engageable with its respective platform when pivoted between the rods resiliently to urge the links and fingers from alignment, a stop rod mounted in parallel relation to the support rods, a bar slidably mounted on the stop rod and rigidly interconnecting the sleeves for corresponding elevational movement, a lower stop mounted on the stop rod engageable with the bar to limit downward travel of the sleeves with the support rods to positions short of the predetermined lower limits of travel of the rods sufficient to pivot the fingers and links between the support rods, and an upper stop mounted on the stop rod engageable with the bar to limit upward movement of the sleeves with the support rods to positions short of the predetermined upper limits of travel of the rods sufficient to move the sleeves to substantially their lowermost positions thereon thrusting the fingers into substantially horizontal attitude.

12. A bottle casing machine as specified in claim 4 having a retainer plate mounted between the bottle conveyor and the elevator for reciprocal elevational movement between a bottle confining position upwardly extended above the conveyor in alignment transversely of the conveyor from the loader and a downwardly retracted position, and a control linkage interconnecting the loader and the retainer plate for moving the retainer plate into retracted position in response to movement of the loader transversely of the conveyor toward the elevator and into its bottle retaining position in response to return movement of the loader.

13. A bottle casing machine as specified in claim 5 having a retainer plate mounted between the bottle conveyor and the elevator for reciprocal elevational movement between a bottle retaining position extended upwardly from the conveyor and a downwardly retracted position, and control means interconnecting the loader and the retainer plate retracting the retainer plate in response to movement of the loader transversely of the bottle conveyor toward the elevator and elevating the retainer plate in response to retraction of the loader.

14. An apparatus for inserting articles into containers comprising a lower conveyor for transporting upwardly open containers successively to a loading station; means for momentarily retaining the containers at the loading station; an upper conveyor for transporting the articles to a collection station above the containers at the loading station; a platform; means pivotally mounting the platform for reciprocal rectilinear elevational movement between a position horizontally aligned with the upper conveyor and laterally adjacent thereto and a lower position within containers whose travel is momentarily interrupted on the lower conveyor; control means locating the platform in horizontal position at the upper limit of travel thereof, maintaining the platform in horizontal position during downward movement into containers, pivoting the platform to a downwardly directed position at the lower limit of travel, and maintaining the platform in the downwardly directed position during upward movement from the containers; and means synchronous with the elevational movement of the platform for transferring articles from the upper conveyor onto the platform when the platform is horizontally aligned with the upper conveyor.

15. A mechanism for lowering articles into restricted quarters and depositing the articles therein comprising an elongated substantially erect support member mounted for reciprocal elevational movement between predetermined upepr and lower limits of travel, means mounted on the support member for slidable movement longitudinally thereof, a platform pivotally mounted on the slidable means for movement between a substantially horizontal article supporting position and a substantially vertical retracted article depositing position, resilient means mounted on the slidable means urging the platform from its substantially vertical retracted position, a link pivotally interconnecting the support member below the slidable means and the platform, and stop means limiting upward and downward movement of the slidable means with the support member to positions short of the upper and lower limits of travel of said member whereby relative movement of the member and slidable means near the limits of travel causes the link to pivot the platform between a horizontal load receiving position and a downwardly directed load discharging position.

References Cited in the file of this patent

UNITED STATES PATENTS

| Number | Name | Date |
|---|---|---|
| 2,040,436 | Howard | May 12, 1936 |
| 2,119,767 | Anderson | June 7, 1938 |
| 2,236,945 | Gibbs | Apr. 1, 1941 |
| 2,277,688 | Cattonar et al. | Mar. 31, 1942 |
| 2,358,447 | Creamer | Sept. 19, 1944 |
| 2,371,027 | Cattonar et al. | Mar. 6, 1945 |
| 2,431,265 | Madsen et al. | Nov. 18, 1947 |
| 2,535,828 | Ardron | Dec. 26, 1950 |